UNITED STATES PATENT OFFICE.

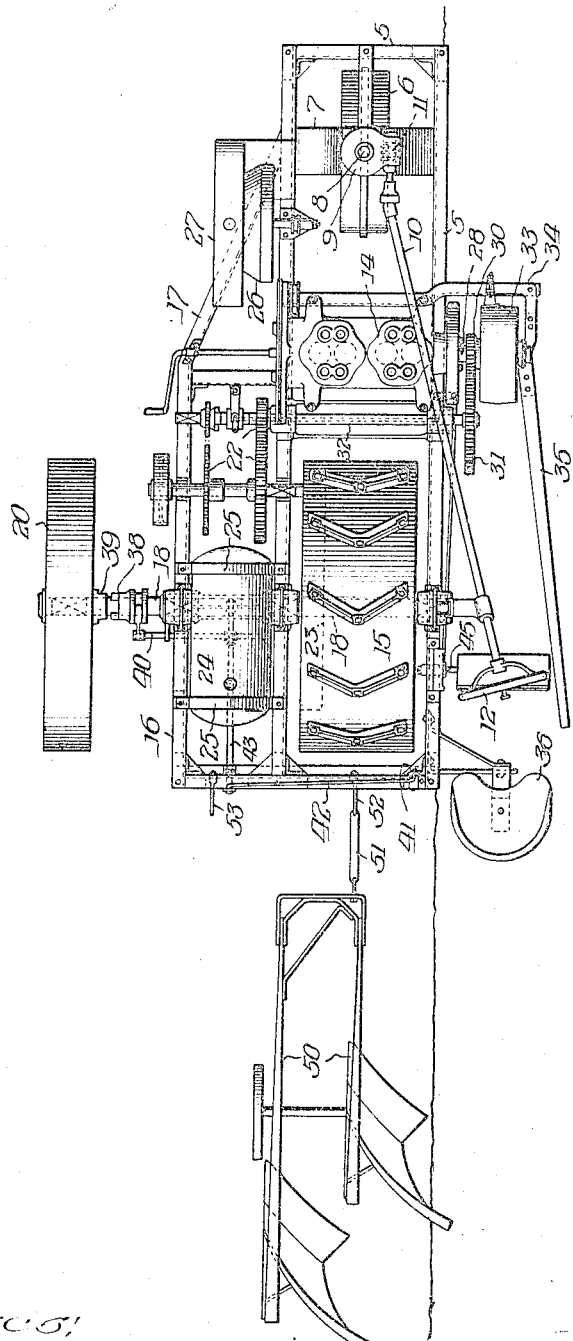

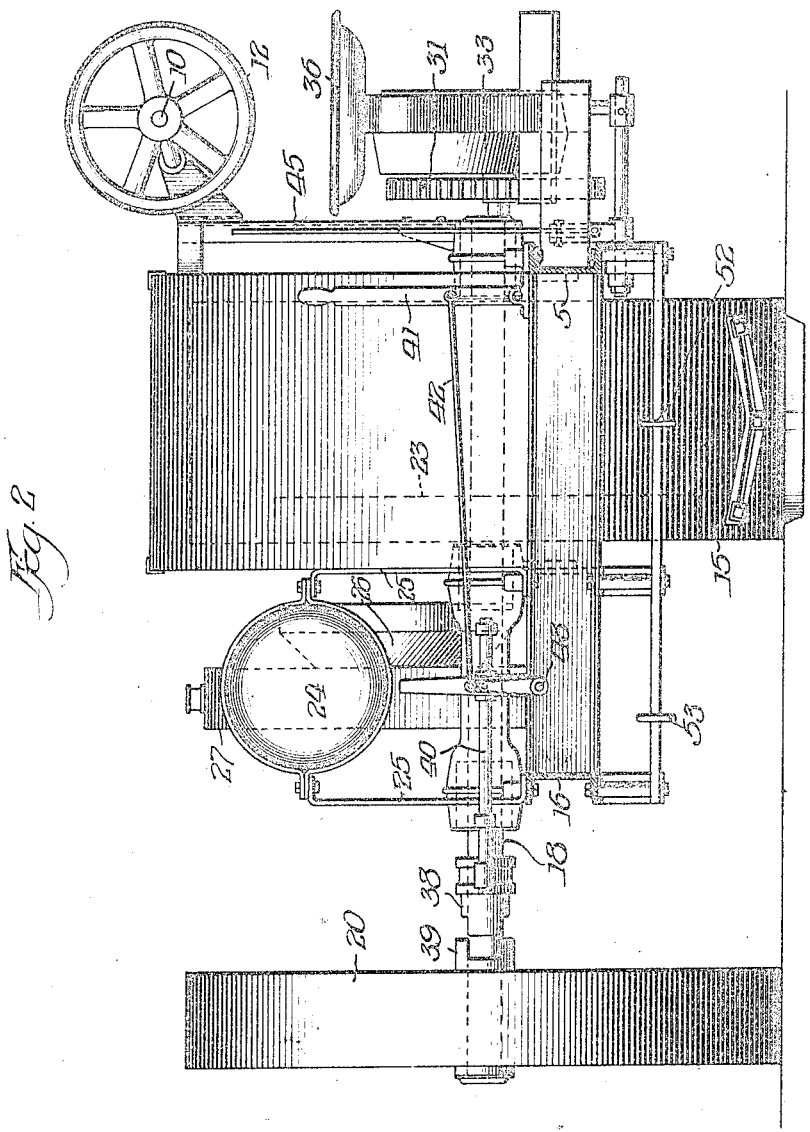

DAVID P. DAVIES, OF RACINE, WISCONSIN, ASSIGNOR TO J. I. CASE THRESHING MACHINE COMPANY, OF RACINE, WISCONSIN, A CORPORATION.

TRACTION-ENGINE.

1,209,815.  Specification of Letters Patent.  Patented Dec. 26, 1916.

Application filed October 28, 1914. Serial No. 869,127.

*To all whom it may concern:*

Be it known that I, DAVID P. DAVIES, a citizen of the United States, residing at Racine, in the county of Racine and State of Wisconsin, have invented certain new and useful Improvements in Traction-Engines, of which the following is a specification.

Small traction engines for plowing with a plurality of plows have been to a large extent inefficient and unsatisfactory for the reason that they have been so constructed and arranged that it has been necessary to have one or more of the wheels thereof travel in a furrow, in which cases, where the front steering wheel and the driving wheel are used in the furrow, it is necessary that the latter be narrow because of the limited space which such wheel may occupy in the furrow. With the driving wheel traveling in the furrow, it is impracticable to so hitch the plows to the tractor as to prevent side draft, with the result that the front steering wheel is caused to crowd against the landside of the furrow to counteract such side draft, and, where deep plowing is required, heavy labor is forced upon the tractor in the effort to equalize the draft, thus deducting from the general efficiency of the tractor, and the crowding of the wheels in the manner indicated and the unevenness of the newly plowed dirt in the furrow over which such wheels must travel cause the tractor to strain appreciably, resulting in the weakening and rending of parts thereof. Under such conditions, it is almost impossible to turn the first furrow straight, and, in order to overcome the side strain which exists, and to steady and balance the tractor, it is the practice to heavily weight the front end of the tractor, in some instances, with several hundred pounds of metal in the endeavor to prevent its front end from twisting or turning away from the furrow. In other instances, where two front steering wheels are employed with one large driving wheel traveling on the unplowed ground, such arrangement permits the drive wheel to be centered with a four-bottom plow, but, when the number of plows is reduced, an unequal pulling strain is the result, and the same difficulties because of side draft, as hereinbefore pointed out, are present, imparting to the tractor a tendency to turn from a straight path at its forward end and necessitating unusual care and labor on the part of the operator to prevent such irregular travel.

The object of my invention is to obviate the difficulties pointed out and to produce a tractor especially adapted for use on what may be considered small farms, which shall be comparatively light in weight, perfectly balanced and stable, and so constructed that when operated for plowing all of its wheels will travel only upon unplowed soil, and the general arrangement such that any side draft upon the tractor from the plows will be overcome and the tractor maintained in a straight line of travel. Also, that the operator may be so positioned as to be within convenient reach of the various mechanisms for controlling the tractor and to have an unobstructed view of the last cut furrow and the work being accomplished, as well as other features, which will hereinafter more fully appear.

In the accompanying drawings, which form a part hereof, Figure 1 is a plan of my improved tractor showing a two-bottom plow connected thereto, and Fig. 2 is a rear elevation of the tractor.

In said drawings, the portions marked 5 indicate the main frame of my improved tractor, which is preferably of plain rectangular design, substantially as indicated in Fig. 1. In the forward end of said frame, I pivotally mount a steering wheel, 6, in a suitable bearing, 7, of any well known or approved construction, the upper end of the pivotal member, 8, being provided with a gear (not shown) inclosed in a casing, 9, with which a steering rod, 10, communicates by means of worm, 11, said rod extending rearwardly and provided with a hand wheel, 12, as usual, such arrangement of the pivotal mounting and steering being of any ordinary or well known form. Behind said wheel 6 is mounted a motor, 14, of any appropriate character, and in the rear of said motor is a comparatively wide drive wheel, 15, said steering wheel, motor and drive wheel being arranged and mounted in the frame in tandem so as to insure their substantially perfect alinement and balance, as they are so positioned in the frame in relation to each other that their combined weight is equally distributed. At one side of said main frame and rigidly attached thereto, I provide an auxiliary frame, 16, which may be braced at its forward end to the main frame by a rod or bar, 17, and to which auxiliary frame and main frame 5 the axle, 18, of drive wheel 15 is secured. At the outer end of said axle, I mount a guide wheel, 20, which may be readily converted into an idler or traction wheel, as desired. Mounted upon said auxiliary frame, and associated with said motor, is suitable transmission mechanism, 22, comprising a system of gearing of any desired character, which in turn communicates with a gearing, 23, (indicated in dotted lines) in drive wheel 15, and imparts motion to said wheel in a manner well known in the art. Also, upon said auxiliary frame, I support a fuel supply tank, 24, by suitable supports, as 25, and, at the forward end of the main frame, a fan and radiator, 26, 27, of any suitable character may be supported for a well known purpose.

At one side of the main frame, upon the motor shaft, 28, I mount transmission gearing, 30, 31, which imparts motion through shaft, 32, to the transmission mechanism 22 in a well known manner. A friction pulley, 33, is also mounted upon motor shaft 28 and is controlled through the lever mechanism, 34, 35, to actuate the transmission mechanisms to impart rotary motion to drive wheel 15 or driving power to other machinery in a manner well known in the art, said lever 35 extending to within convenient reach of the operator who occupies seat, 36. Guide wheel 20 is mounted upon axle 18 in a manner to normally act as an idler, but may be utilized as a traction wheel by engaging clutch member, 38, on said axle with clutch member, 39, on said guide wheel, through the manipulation of shipper rod, 40, communicating with member 38 in a well known manner, said rod being under control of the operator by means of lever, 41, and connecting links, 42, 43, as will be readily understood. Also, arranged in proximity to the driver's seat 36 is the usual controlling lever, 45, suitably connected to the motor for reversing the motion of the tractor, in a well known manner.

For the purpose of illustrating and describing my improved tractor as a plowing engine, I have shown, Fig. 1, a two-bottom plow, 50, attached thereto by a suitable hitch, 51, connected to a looped member, 52, or otherwise on the main frame 5 of the tractor, which attachment as shown is made medianly of the drive wheel so that the draft on the plow will be in direct line with the drive wheel, motor and steering wheel. As thus arranged, the forward plow will lie in proper range for the succeeding furrow, while the drive wheel and the remainder of the tractor will travel upon the unplowed ground, the edge of said wheel being an appreciable distance from the edge of the last cut furrow, as is apparent by reference to Fig. 1 which indicates said furrow in an irregular line. Where three plows are employed, the hitch 51 is attached to the middle of the plow frame, so that the drive wheel will be a much greater distance from the furrow, that is, approximately one and a half times the width occupied by one plow, and, when the tractor is utilized for drawing vehicles, they are connected to hitch member, 53, at the rear of the auxiliary frame, so that the vehicle wheels will be properly positioned to regularly follow in the tread of tractor wheels 15, 20. During the operation of plowing with any desired number of plows, guide wheel 20 acts as an idler and holds the tractor as a whole in a straight line of travel, counteracting any tendency of the forward end to turn away from the last cut furrow, so that by proper manipulation of the steering wheel, and the counter effect of the guide wheel, I am enabled to obviate any lateral distribution of the draft and maintain the tractor in an unswerving path, and in actual practice I have demonstrated that said steering wheel requires but slight attention as it normally maintains a direct course without tendency to turn unless influenced by unusual earth formations. The drive-wheel and guide-wheel, being of the same diameter and mounted upon the same axle, are spaced the proper distance apart so that they will tread in wagon tracks when the tractor is propelled over roads, and when thus traveling I may, if desired, throw in clutch 38—39 so that said guide wheel will have the same peripheral speed as the main drive-wheel and become a traction wheel and thus impart additional propelling power to the tractor, or where it is unnecessary to maintain it in the latter position, I can at will so change it to assist in driving through sandy or soft spots or ruts, which is of considerable advantage, as I am thus enabled, where necessity demands, to impart additional traction power to the tractor as a whole, and thus readily move through ruts or the like.

In the use of traction engine for plowing, so far as I am aware, much difficulty is experienced in finishing the field, and a portion of the land remains unplowed because of the lack of space between fences or other obstructions and the last cut furrow, which limits the employment of the engine beyond its ordinary width. When finishing with my improved tractor, however, I propel the machine and plows in a direction opposite to that which had been traveled, with the result that the idler wheel will occupy a position in the newly plowed soil, so that a greater space will exist between the drive wheel and fence, and said wheel is thus enabled to travel over land which with the ordinary type of tractor would not be possible to plow. Under these circumstances it is highly important and of material advantage that the idler wheel be capable of being locked to the drive axle to give it traction power, and which insures that there will be uniform traction between it and the drive wheel, whereby I am enabled to propel the tractor in soft earth.

I claim as my invention:

1. In a traction engine, the combination of a main frame, an auxiliary frame rigidly connected therewith, a drive wheel axle secured by said frames, a drive wheel on said axle within said main frame, and a convertible traction and guide wheel of substantially the same diameter as said drive-wheel mounted on said axle adjacent said auxiliary frame.

2. In a traction engine, the combination of a main frame, an auxiliary frame associated therewith, a drive wheel axle supported by said frames, a drive wheel on said axle within said main frame, a guide and traction wheel on said axle adjacent said auxiliary frame, and means associated with said axle and guide-wheel for converting the same into an idler or traction wheel.

3. In a traction engine, the combination of a main frame, a steering wheel, motor and drive wheel mounted in said frame in tandem, an axle supporting said drive wheel, an auxiliary frame associated with said main frame, and a guide and traction wheel of substantially the same diameter as said guide-wheel mounted on said axle adjacent said auxiliary frame.

4. In a traction engine, the combination of a main frame, an auxiliary frame associated therewith, a drive wheel axle supported by said frames, a drive wheel on said axle within said main frame, a guide and traction wheel on said axle adjacent said auxiliary frame, a motor mounted on said main frame in advance of said drive wheel, a steering wheel mounted in said main frame in advance of said motor, means associated with said motor and said drive wheel for imparting motion to the latter, means for operating said steering wheel, and means associated with said axle and adjustable in relation thereto for converting said guide wheel into an idler or traction wheel.

5. A traction engine comprising a main frame, an auxiliary frame at one side thereof, a steering wheel and a drive wheel mounted in said main frame in tandem to travel over unplowed soil, an axle carried by said frames for supporting said drive-wheel, a guide and traction wheel mounted upon said axle and adjustable in relation thereto and positioned adjacent said auxiliary frame to maintain said traction engine in a straight line of travel, and means for converting said guide wheel into a traction wheel to assist said drive wheel in propelling said engine.

6. A traction engine comprising a main frame, an auxiliary frame associated therewith, and rigidly connected thereto, an axle supported by said frame, a steering wheel, motor and drive wheel mounted in said main frame in tandem, means for attaching a plow to said frame positioned in a median line of said drive wheel, a guide wheel of substantially the same diameter as said drive-wheel mounted upon said axle and associated with said auxiliary frame for preventing the forward end of said engine from turning and maintaining the same in a straight line of travel, and means associated with said axle and said guide wheel whereby the latter may be converted into a tractor wheel to coöperate with said drive wheel in propelling the tractor.

7. In a traction engine, the combination of a main frame, a steering wheel, motor and drive wheel mounted therein, an auxiliary frame associated with said main frame, an axle supported by said frames and upon which said drive-wheel is mounted, transmission mechanism mounted upon said auxiliary frame and communicating with said motor and said drive wheel, means communicating with said motor for converting said engine into a tractor or power supplying engine, and a convertible traction and guide wheel adjustably mounted upon said axle and associated with said auxiliary frame for maintaining said engine in a straight line of travel when plowing and for propelling said engine along roadways.

8. In a traction engine, the combination of a main frame, a steering wheel, motor and drive wheel mounted therein, a steering rod communicating with said steering wheel for operating the same and extending to one side of the engine, a clutch mechanism associated with said motor, a clutch operating lever communicating with said clutch mechanism for operating the same and extending to one side of the engine in proximity to said steering rod, an auxiliary frame associated with said main frame, a guide wheel adjacent said auxiliary frame, clutch mechanism associated with said guide wheel, and an operating lever communicating with said clutch mechanism for operating the same and positioned in proximity to said steering rod.

9. A traction engine including a frame, a steering wheel, a drive wheel, an idler wheel, a single axle for supporting said drive and idler wheels, said wheels being so disposed as to travel on unplowed ground, and clutch mechanism associated with said axle and said idler wheel whereby the latter can be converted into a traction wheel to coöperate with said drive wheel in propelling said engine.

In testimony whereof I affix my signature in presence of two witnesses.

DAVID P. DAVIES.

Witnesses:
M. ELHOLM,
J. A. WALSH.